United States Patent [19]

Fliedner et al.

[11] Patent Number: 5,261,930
[45] Date of Patent: Nov. 16, 1993

[54] POLYCRYSTALLINE, SINTERED ABRASIVE GRANULES BASED ON α-AL₂O₃ PROCESS FOR THEIR PRODUCTION AND THEIR USE

[75] Inventors: Christine Fliedner, Bonn; Gerhard Rehfeld, Aachen; Dietrich Maschmeyer, Marl, all of Fed. Rep. of Germany

[73] Assignee: Huels Aktiengesellschaft, Marl, Fed. Rep. of Germany

[21] Appl. No.: 873,145

[22] Filed: Apr. 24, 1992

[30] Foreign Application Priority Data

Apr. 25, 1991 [DE] Fed. Rep. of Germany ....... 4113476

[51] Int. Cl.⁵ .................................................. B24D 3/00
[52] U.S. Cl. ........................................ 51/293; 51/295; 51/309
[58] Field of Search ........................... 51/293, 295, 309

[56] References Cited

U.S. PATENT DOCUMENTS

| | | | |
|---|---|---|---|
| 4,314,827 | 2/1982 | Leitheiser et al. | 51/309 |
| 4,623,364 | 11/1986 | Cottringer et al. | 51/293 |
| 4,744,802 | 5/1988 | Schwabel | 51/309 |
| 4,770,671 | 9/1988 | Monroe et al. | 51/309 |
| 4,786,292 | 11/1988 | Janz et al. | 51/293 |
| 4,848,041 | 7/1989 | Kruschke | 51/309 |
| 4,881,951 | 11/1989 | Wood et al. | 51/293 |
| 4,964,883 | 10/1990 | Morris et al. | 51/309 |
| 5,011,508 | 4/1991 | Wald et al. | 51/293 |
| 5,085,671 | 2/1992 | Martin et al. | 51/293 |
| 5,102,429 | 4/1992 | Wald et al. | 51/295 |

FOREIGN PATENT DOCUMENTS

| | | |
|---|---|---|
| 0024099 | 2/1981 | European Pat. Off. |
| 0152768 | 8/1985 | European Pat. Off. |
| 0168606 | 1/1986 | European Pat. Off. |
| 0200487 | 11/1986 | European Pat. Off. |
| 0324513 | 7/1989 | European Pat. Off. |

OTHER PUBLICATIONS

Kumagai et al., Communications of the Am. Ceram. Soc., C-230-C-231 (Nov. 1984).
Kumagai et al., J. Am. Ceram. Soc., 68[9]:500-505 (1985).

*Primary Examiner*—Mark L. Bell
*Assistant Examiner*—Willie J. Thompson
*Attorney, Agent, or Firm*—Millen, White, Zelano & Branigan

[57] ABSTRACT

The invention relates to polycrystalline, sintered abrasive granules based on α-Al₂O₃ with a density of >98% of the theoretical density of corundum, a Vickers hardness of 21 GPa and greater and a crystallite size of 0.05 to 1.3 micron, as well as abrasives made from these abrasive granules and the use of these abrasive granules for the production of ceramic, refractory products.

The polycrystalline, sintered abrasive granules based on $\alpha$-Al$_2$O$_3$ are produced by $\alpha$-Al$_2$O$_3$ crystal nuclei being added to a boehmite dispersion, the mixture of the boehmite dispersion and the crystal nuclei being acidified and gelled and the gel being dried, crushed, and sintered. In doing so, 0.5 to 35% by weight of $\alpha$-Al$_2$O$_3$ crystal nuclei, relative to the sintered abrasive granules, is added and the mixture of the boehmite dispersion and of the crystal nuclei is refluxed, while the pH of the mixture is kept in a range of 2.5 to 3.5 by adding acid.

13 Claims, No Drawings

POLYCRYSTALLINE, SINTERED ABRASIVE GRANULES BASED ON α-AL₂O₃ PROCESS FOR THEIR PRODUCTION AND THEIR USE

SUMMARY OF THE INVENTION

The invention relates to polycrystalline, sintered abrasive granules based on $\alpha$-$Al_2O_3$ with a density of >98% of the theoretical density of corundum, a Vickers hardness of about 21 GPa and greater and a crystallite size of about 0.05 to 1.3 micron. The invention further relates to abrasives made from these abrasive granules and the use of these abrasive granules for the production of ceramic, refractory products.

A density greater than 98% of the theoretical density of corundum is intended to mean a density which is greater than 98% of the density of natural corundum (i.e., >98% of 3.97 g/cm³).

The invention also relates to a process for the production of polycrystalline, sintered abrasive granules based on $\alpha$-$Al_2O_3$, in which $\alpha$-$Al_2O_3$ crystal nuclei are added to a boehmite dispersion, the mixture of the boehmite dispersion and the crystal nuclei is acidified and gelled, and the gel is dried, crushed and sintered.

Production of polycrystalline, sintered abrasive granules and abrasives based on $\alpha$-aluminum oxide with the help of the sol-gel process (SG-process) is generally known and results, in many cases, in elements with fine-grained crystal structure, which further can be densely sintered at low temperatures.

Thus, according to U.S. Pat. No. 4,314,827 and EP 0 024 099, boehmite gels can be densely sintered at low temperatures by adding metal oxides, which result in a spinel formation, e.g., by adding MgO. In doing so, the abrasive material is produced by gelling a colloidal dispersion of aluminum hydroxide and the modifying component in the form of a metal salt precursor, e.g., $Mg(NO_3)_2 \cdot 6H_2O$, and subsequent burning of the dried gel at temperatures of about 1350° C.

In publications without reference to abrasives (M. Kumagai, G. L. Messing, "Enhanced Densification of Boehmite-Sol-Gel by Alpha-Alumina Seeding," J. Am. Ceram. Soc. 67, C230-C231, 1984; and "Controlled Transformation and Sintering of a Boehmite-Sol-Gel by Alpha-Alumina Seeding," J. Am. Ceram. Soc. 68, 500-505, 1985), it is reported that in adding submicroscopic $\alpha$-aluminum oxide crystal nuclei to a boehmite dispersion (a dispersion of $\gamma$-aluminum oxide hydrate), elements with 98% of the theoretical density of $\alpha$-$Al_2O_3$ can be obtained by sintering at about 1200° C.

In addition, according to the teaching of EP 0 152 768 and EP 0 324 513, the controlling influence of $\alpha$-$Al_2O_3$ crystal nuclei is imposed on the resulting microstructure to influence the hardness of abrasive materials containing aluminum oxide. This is achieved by adding submicroscopic $\alpha$-$Al_2O_3$ crystal nuclei in an amount of $\leq 1\%$ by weight to the boehmite gels before the drying, calcining and sintering. To produce multiphase systems, the possibility exists, according to EP 0 324 513, of using additives such as spinel formers, e.g., MgO, together with $\alpha$-$Al_2O_3$ crystal nuclei.

In the above-mentioned process according to the prior art, considerable amounts of energy unfortunately have to be used to remove the large amounts of water. The large amounts of water originate from the initial boehmite dispersions which have a relatively low solids content such as, e.g., about 11% by weight, for the production of gels that are as homogeneous as possible.

Only by using expensive process techniques for improving the gel homogeneity, such as, e.g., pressurized mixing, hydrothermal treatment and extrusion according to EP 0 168 606, is it possible to produce, from gels with a high solids content, i.e., with a solids content of greater than 25% by weight, abrasive granules containing aluminum oxide which are comparable in hardness and density to the abrasive granules obtained by the SG-process, which start with dispersions having a low solids content.

The materials obtained by the SG-process, without using expensive process techniques, starting from dispersions with higher solids contents, such as greater than 11% by weight (e.g., Examples 5 and 6 of EP-OS 0 200 487), have unsatisfactory density values which are 88-90% of the theoretical density of corundum. These materials thus have a clearly lower density than those which are obtained by the SG-process, starting from dispersions with low solids content.

An object of the invention, therefore, is to develop a more economical SG-process for the production of abrasive granules based on $\alpha$-$Al_2O_3$, in which the use of expensive, special process techniques is to be dispensed with and which leads to especially dense and hard abrasive granules with improved abrasive-engineering properties.

Upon further study of the specification and appended claims, further objects and advantages of this invention will become apparent to those skilled in the art.

It has now surprisingly been found that with an SG-process, wherein a mixture of a boehmite dispersion and about 0.5-35% by weight of $\alpha$-$Al_2O_3$ crystal nuclei is refluxed and the pH of the mixture is kept in a range of about 2.5-3.5 by adding acid, extremely dense and hard abrasive granules based on $\alpha$-$Al_2O_3$ are attained having a density of >98% of the theoretical density of corundum and a Vickers hardness of 21 GPa and greater.

In accordance with the invention, polycrystalline, sintered abrasive granules based on $\alpha$-$Al_2O_3$ with a density of >98% of the theoretical density of corundum, a Vickers hardness of 21 GPa and greater and a crystallite size of about 0.05 to 1.3 micron can be obtained, as well as abrasives made from such abrasive granules. In addition, it is also possible to use such abrasive granules in the production of ceramic refractory products.

The polycrystalline, sintered abrasive granules based on $\alpha$-aluminum oxide according to the invention, have improved abrasive-engineering properties in comparison with usual $\alpha$-aluminum oxide abrasives. They are distinguished in particular by a very high density, as well as by an extremely high hardness.

The abrasive granules according to the invention can be used for the production of bound abrasive elements (abrasive materials bound to a base, e.g., abrasive belts, abrasive disks, grinding tools, etc.), as well as for the production of ceramic, refractory products. However, they can also be used, either unprocessed or after agglomeration, as a granular abrasive or in liquid or paste form for purposes of grinding or polishing. The granules can be processed, alone or in the form of mixtures with other abrasive granules made from, for example, fused corundum, to form grinding tools.

According to another aspect of the invention, there is provided a process for the production of polycrystalline, sintered abrasive granules based on $\alpha$-$Al_2O_3$, in which α-Al₂O₃ crystal nuclei are added to a boehmite dispersion, the mixture of the boehmite dispersion and the crystal nuclei is acidified and gelled and the gel is dried, crushed, and sintered, which is characterized in that 0.5 to 35% by weight of α-Al₂O₃ crystal nuclei, relative to the sintered abrasive granules, is added, the mixture of the boehmite dispersion and the crystal nuclei is refluxed, and the pH of the mixture is kept in a range of 2.5 to 3.5 by adding acid.

The production of the boehmite dispersion takes place preferably either by suspending boehmite powder in water and then adding a peptizing agent or by adding boehmite powder to an aqueous solution of a peptizing agent.

Then, addition of α-Al₂O₃ crystal nuclei to the refluxed boehmite dispersion occurs. Preferably, 5 to 35% by weight of α-Al₂O₃ crystal nuclei, relative to the sintered abrasive granules, is added. The crystal nuclei are preferably added in the form of an acid dispersion. The mixture of the boehmite dispersion and the crystal nuclei is preferably refluxed at temperatures of 50°–95° C.

Suitable acids for the acid dispersion are single-proton acids, e.g., formic acid, acetic acid, hydrochloric acid and nitric acid. The crystal nuclei can also be added directly, i.e., without a dispersion medium. Nonacidic dispersions, e.g., neutral dispersions can also be used for addition of the crystal nuclei.

By further addition of acid, the pH of the mixture of boehmite dispersion and α-Al₂O₃ crystal nuclei is adjusted to a value in the rage of about 2.5 to 3.5.

The solids content of the mixture of boehmite dispersion and crystal nuclei can be selected in a wide range. The solids content of the mixture of the boehmite dispersion and the crystal nuclei is preferably 5–50%, especially 20–40% by weight.

The gelation of the mixture of the boehmite dispersion and the crystal nuclei can take place with or without adding gelling auxiliary agents. The pH can be constantly readjusted within the above-mentioned range of 2.5 to 3.5 until the pH level finally remains almost constant.

Preferably, the mixture of the boehmite dispersion and the crystal nuclei is gelled by evaporation of water or the solvent employed. For example, water removal during gelation can be performed by intensive stirring and evaporation.

With the process according to the invention, a far more homogeneous gel is produced than with the process according to the prior art. As a result, in the process according to the invention, inter alia, processing of the higher solids contents of the mixture of the boehmite dispersion and crystal nuclei, e.g., greater than 11% by weight, is made possible, namely without expensive process technique. Conversely, according to the process of the prior art, solids contents of greater than 11% by weight can be handled only by using very expensive process techniques. Further, the process according to the invention can be performed easily relative to all process parameters and under steady control.

The gel thus obtained can be put in any desired form first by pressing, pouring and extruding and then dried, calcined, and sintered. Alternatively, for the production of abrasive granules, it can first be put in a form suitable for drying, for example, in plate form, and dried gently by conventional dehydration methods.

The dried gel can be broken either directly before or after the calcination in an intermediate cooling by any conventional crushing technique. The presifted, granular dry gel or the dried gel element is preferably calcined at a temperature of about 400°–800° C. until the dehydration of boehmite is completed. The crushed product or the calcined granule or the calcined element is sintered, either directly or after an intermediate cooling to room temperature, namely until the conversion to α-Al₂O₃ is completed. Preferably, the crushed product or the calcined granule or the calcined element is sintered at temperatures of 1100° to 1400° C. The sintered abrasive granules can be graded after the cooling to room temperature according to form and standard size, e.g., by sifting.

The sintered abrasive granules have a crystallite size of 0.05 to 1.3 micron, and the crystallite size is determined with scanning electron microscopy.

To provide the boehmite dispersion, suitably commercially available, easily dispersible, high-purity aluminum hydroxide can be used. For example, high-purity aluminum hydroxide of the following composition can be employed: $Al_2O_3 > 72\%$ by weight; $SiO_2 < 0.025\%$ by weight; $Fe_2O_3 < 0.020\%$ by weight; and $Na_2O < 0.005\%$ by weight; with a high specific surface area of, e.g., $> 100\ m^2/g$, preferably $> 150\ m^2/g$, can be used (such as, e.g., DISPERAL ALUMINA ® of the Condea Chemie GmbH Company, Brunsbuettel).

The particle size of the α-Al₂O₃ crystal nuclei has no significant influence on the fine crystallinity and the physical properties of the sintered product. In the process according to the invention, crystal nuclei with an average particle size ($d_{50}$ value) of preferably 0.1 to 1 micron, especially preferably of 0.22 to 0.26 micron, are used, e.g., crystal nuclei TM-DR ® of the Taimai Chemicals Co., Ltd. company, i.e., the crystal nuclei have an average particle size ($d_{50}$ value) of preferably 0.1 to 1 micron, especially preferably 0.22 to 0.26 micron [$d_{50} = 50\%$ of the particles have a particle size smaller than the indicated value].

The dispersing of the boehmite powder or of the crystal nuclei and the sol formation of the mixture of the boehmite dispersion and the crystal nuclei can usually be achieved by adding peptizing agents such as single-proton acids, e.g., formic acid, acetic acid, hydrochloric acid and nitric acid. Nitric acid is the preferred peptizing agent.

Surprisingly, abrasive granules are obtained with the process according to the invention with a density of greater than 98%, i.e., almost the theoretical density of corundum. Simultaneously very high Vickers hardness of 21 GPa and greater (at 500 g load are achieved).

Centrifuging to separate optionally present, coarser particles from the boehmite dispersion or the dispersion of the α-Al₂O₃ crystal nuclei, as is described as technically necessary in U.S. Pat. No. 4,314,827 or EP 0 024 099, is not necessary to produce the abrasive granules according to the invention, if production is performed according to the process of the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

Hardness (GPa) of sintered samples is measured by the indentation test with a hardness measuring device, according to Vickers (DIN 50 133). All determinations of hardness values are made under a 500 g load [$HV_{(500)}$GPa=Hardness according to Vickers in GPa at 500 g load.].

The entire disclosure of all applications, patents and publications cited above, and of corresponding German application P 41 13 476.1, are hereby incorporated by reference.

EXAMPLES

Comparison Example 1

(According to EP 0 168 606, Example 2)

40 pounds of aluminum hydroxide powder CONDEA PURAL SB ® is mixed together with 11 pounds of water, which contains 2.266% by weight of $\alpha$-$Al_2O_3$ crystal nuclei (dispersed in the water by mill grindings when grinding the water with $Al_2O_3$ grinding media) and another 14 pounds of tap water in an attrition mill. A solution of 1600 ml of concentrated nitric acid in 1600 ml of tap water is added to this mixture within 2 minutes. Then, 6 pounds of tap water is added. The mixture is mixed for another 2 minutes and then extruded. In doing so, the mixture is extruded with a pressure of 500 to 1000 pounds per inch through holes with a ⅛ inch diameter. After 5 minutes of sintering at 1400° C., the thus-obtained material has a hardness of 19.5 to 20 GPa and a density of 97% of theoretical density of corundum.

According to the teaching of EP 0 168 606, the preferred content of $\alpha$-$Al_2O_3$ crystal nuclei is about 1% by weight, relative to the solids portion of the total mixture, because a content of $\alpha$-$Al_2O_3$ crystal nuclei of greater than 5% by weight results in increased granule growth in the sintered product and reduces its hardness (see EP 0 168 606, Example 2, lines 19-22).

EXAMPLE 1

1212 g of aluminum hydroxide DISPERAL ® is homogeneously dispersed with 4552 g of completely desalted water in a tank with stirring and refluxed to 80° C. In the meantime, a dispersion of 102 g of $\alpha$-$Al_2O_3$ crystal nuclei TM-DR ® in 700 g of completely desalted water is produced by adding 11 g of 65% by weight of nitric acid with stirring, which is also refluxed to 80° C.

The also still hot dispersion of $\alpha$-$Al_2O_3$ crystal nuclei is added to the boehmite dispersion refluxed to 80° C. Then, the adjustment of the pH of the mixture of the boehmite dispersion and the crystal nuclei to a value of 2.7 takes place, by titration with 65% by weight nitric acid. The solids content of the mixture of boehmite dispersion and $\alpha$-$Al_2O_3$ crystal nuclei is 20% by weight.

After about 20 hours, the mixture is allowed to gel, by the water being evaporated and the pH being readjusted constantly to the above-mentioned value, until the latter finally remains constant. When reaching the desired viscosity, the reaction is broken off, the product is poured into evaporating dishes with a height of 2 to 3 cm and dried at 80° C. covered in a moist drying oven.

The dry gel is crushed with a jaw crusher and presifted. After the calcination at 400° C., the granules are heated in a furnace to a temperature of 1300° C. for sintering. The retention time is 55 minutes and the content of crystal nuclei, relative to the sintered product, is 10% by weight.

The density of the produced abrasive granules is 3.91 g/cm$^3$, i.e., 98.5% of the theoretical density of corundum and the Vickers hardness (at 500 g of load), 22.1 GPa.

EXAMPLE 2

Example 1 is repeated, and the content of crystal nuclei, relative to the sintered product, is also 10% by weight as in Example 1, only the solids content of the mixture of the boehmite dispersion and the $\alpha$-$Al_2O_3$ crystal nuclei is at 40% by weight. The density of the produced abrasive granules is 3.92 g/cm$^3$, i.e., 98.7% of the theoretical density of corundum and the Vickers hardness (at 500 g load) is 21.5 GPa.

EXAMPLE 3

389 g of aluminum hydroxide DISPERAL ® is homogeneously dispersed with 1130 g of completely desalted water in a tank with stirring and refluxed to 80° C. In the meantime, a dispersion of 127 g of $\alpha$-$Al_2O_3$ crystal nuclei TM-DR ® in 822 g of completely desalted water is produced by adding 16.5 g of 65% by weight of nitric acid with stirring, which also is refluxed to 80° C.

The also still hot dispersion of $\alpha$-$Al_2O_3$ crystal nuclei is added to the boehmite dispersion refluxed to 80° C. Then, the adjustment of the pH of the mixture of the boehmite dispersion and the crystal nuclei to a value of 2.7 takes place, by titration with 65% by weight nitric acid. The solids content of the mixture of boehmite dispersion and $\alpha$-$Al_2O_3$ crystal nuclei is 21% by weight, and the content of crystal nuclei, relative to the sintered product, is 30% by weight. The additional working up takes place analogously to Example 1.

The density of the abrasive granules sintered at 1300° C. with a retention time of 90 minutes is 3.94 g/cm$^3$, i.e., 99.2% of the theoretical density of corundum and the Vickers hardness (at 500 g load) is 22.0 GPa.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of polycrystalline, sintered abrasive granules based on $\alpha$-$Al_2O_3$, comprising adding $\alpha$-$Al_2O_3$ crystal nuclei to a boehmite dispersion to form a resultant mixture; acidifying and gelling said mixture; and drying, crushing and sintering said gel to form said sintered abrasive granules, the improvement wherein 0.5-35 wt. % $\alpha$-$Al_2O_3$ crystal nuclei, relative to the total weight of the sintered abrasive granules, is added to said boehmite dispersion;

said resultant mixture is refluxed; and the pH of said resultant mixture is adjusted to 2 5-3.5 by acid addition.

2. A process according to claim 1, wherein said $\alpha$-$Al_2O_3$ crystal nuclei have an average particle size ($d_{50}$ value) of 0.1-1 micron.

3. A process according to claim 7, wherein said $\alpha$-$Al_2O_3$ crystal nuclei have an average particle size ($d_{50}$ value) of 0.22-0.26 micron.

4. A process according to claim 1, wherein said $\alpha$-Al$_2$O$_3$ crystal nuclei are added to said boehmite dispersion in the form of an acid dispersion.

5. A process according to claim 1, wherein said resultant mixture of boehmite dispersion and $\alpha$-Al$_2$O$_3$ crystal nuclei is refluxed at a temperature of 50°–95° C.

6. A process according to claim 1, wherein said resultant mixture of boehmite dispersion and $\alpha$-Al$_2$O$_3$ crystal nuclei is gelled by evaporation of water.

7. A process according to claim 1, wherein the solids content of said resultant mixture of boehmite dispersion and $\alpha$-Al$_2$O$_3$ crystal nuclei is 5–50 wt. %.

8. A process according to claim 7, wherein said solids content is greater than 11 wt. %.

9. A process according to claim 1, wherein the dried, crushed gel product is sintered at a temperature of 1100°–1400° C.

10. A process according to claim 1, wherein 5–35 wt. % of $\alpha$-Al$_2$O$_3$ crystal nuclei, relative to the total weight of the sintered abrasive granules, is added to said boehmite dispersion.

11. A process according to claim 1, wherein said boehmite dispersion further contains a peptizing agent.

12. A process according to claim 1, wherein said boehmite dispersion is prepared by adding boehmite powder to an aqueous solution of a peptizing agent.

13. A process according to claim 7, wherein said solids content is 20–50 wt. %.

* * * * *